US006892674B1

(12) United States Patent
Dubinins et al.

(10) Patent No.: US 6,892,674 B1
(45) Date of Patent: May 17, 2005

(54) VARIABLE SOUND-EMITTING TOY FOR A PET

(75) Inventors: Dmitrijs V. Dubinins, Parker, CO (US); Kenneth A. Jellico, Littleton, CO (US)

(73) Assignee: N'Gen New Generation Innovations LLC, Littleton, CO (US)

( * ) Notice: Subject to any disclaimer, the term of this patent is extended or adjusted under 35 U.S.C. 154(b) by 0 days.

(21) Appl. No.: 10/249,849

(22) Filed: May 12, 2003

(51) Int. Cl.[7] .............................................. A01K 29/00
(52) U.S. Cl. ...................... 119/707; 119/702; 446/188
(58) Field of Search ................ 446/188, 213, 446/216; 119/702, 707

(56) References Cited

U.S. PATENT DOCUMENTS

| | | | | |
|---|---|---|---|---|
| 3,106,397 A | * | 10/1963 | Lacey ......................... | 473/571 |
| 5,133,551 A | * | 7/1992 | Handy et al. ............... | 473/567 |
| 5,306,193 A | * | 4/1994 | Yang .......................... | 446/215 |
| 5,590,875 A | * | 1/1997 | Young ........................ | 473/457 |
| 6,123,599 A | * | 9/2000 | Chiang ....................... | 446/397 |
| 6,679,927 B2 | * | 1/2004 | Strongin ..................... | 446/213 |

* cited by examiner

Primary Examiner—Teri Pham Luu
Assistant Examiner—Kimberly S. Smith
(74) Attorney, Agent, or Firm—N'Gen New Generation Innovations L.L.C.; Kenneth A. Jellico; Dmitrijs V Dubinins

(57) ABSTRACT

This invention features a toy, which emits variable sounds generated by singular and/or collective methods, comprising of an assemblage of a first material forming article body portion, hereinafter named as "toy body portion," comprised of substantially elastomeric materials and formed hollow, and a second material forming article frame portion, hereinafter known as "cylindrical frame" comprised of substantially rigid materials. Said cylindrical frame further comprises an integrated sound tube device with associated sliding whistle component. An air aperture is formed within the tubular wall of said sound tube and positioned so as enveloped by the interior cavity of the toy body portion, whereby physical compression or expansive decompression of the toy body portion will directionally actuate air into and through said sound tube device. In its preferred embodiment, said toy body portion has said cylindrical frame located centrally through toy body portion and protruding through each side thereof.

16 Claims, 7 Drawing Sheets

US 6,892,674 B1

VARIABLE SOUND-EMITTING TOY FOR A PET

BACKGROUND OF INVENTION

This invention generally relates to a pet toy. In particular, this invention relates to a variable sound-emitting toy for a pet, that when manipulated by a user will produce and emit variable sounds by singular and/or collective methods.

There are a number of non-electronic variable sound-emitting toys in the prior art for entertaining and stimulating their users with sound, often pets or children. The history of non-electronic, variable sound-emitting toys has generally involved solutions, which require both the purposeful rotation of the toy and gravity to emit sound through the conventional use of one or more mechanical sound tube devices. Furthermore, the prior art requires these toys to be altogether constructed of fabricated materials of an inflexible nature (i.e. rigid PVC plastic) to carry the sound tube device(s), thus inhibiting free play therewith. In addition, toys of the prior art generally require direct supervision; as for pet usage, the animal's likely desire to chew will result in damage or destruction of the toy and endanger the health or safety of the animal.

U.S. Pat. No. 6,679,927 discloses a toy, which emits sound as it is moved, comprising: a toy body of formed plastic (PVC) material, which is inflexible in nature; and a plurality of mechanically-operated sound tubes carried within the article body. The result is that the toy will only emit substantial amounts of sound if it is purposefully rotated on its axis to create a sound. Said particular handling requirements prevent sound while toy axis is stationary or when pet is exerting physical or oral compression onto the toy, thus depriving the pet of playful or fanciful sounds. Such limited stimulation reduces the likelihood that a user, such as a pet, will be sufficiently interested in the toy to use as intended.

U.S. Pat. No. 5,590,875 provides another example of such a device. The device disclosed in that patent provides a hollow plastic baseball with external openings to allow airflow therethrough carrying a single sound tube. The sound tube produces sound only when the sliding whistle is moved along the tube by gravity, or by the forces involved in throwing the ball. Accordingly, the ball will emit noise only when the tube is properly oriented relative to the ground, or thrown in a manner to create movement of the sliding whistle. The result is that the ball will only emit substantial amounts of sound if it is handled purposefully in said manner so as to create the sound.

Accordingly, it is desirable to provide a variable sound-emitting toy for a pet, which overcomes the limitations of existing non-electronic, variable sound-emitting toys.

A further need exists to provide a toy for a pet that incorporates the additional sensory attractions whereby sound is emitted upon movement and/or when the toy is physically compressed or expansively decompressed, further providing the capability to selectively deliver a multitude of variable sounds by various methods to keep the target user's attention once engaged, whereby an animal will frequent the toy on its own initiative more often, thereby improving its physical condition, health, and mental alertness through its own efforts.

A further need exists to provide a toy for a pet, which provides a visual attraction that is of an appropriate size and shape to engage the target user's attention.

A further need exists to provide a toy for a pet, which delivers the desired handling, texture and feel, as the greater part of the present invention's mass is soft and flexible.

SUMMARY OF INVENTION

The present invention relates generally to new and novel improvements relating to non-electronic, variable sound-emitting toys for pets. Briefly described, the toy embodying aspect of this invention comprises a toy body portion, preferably (although not necessarily) a hollow, soft, elastomeric form having a trapezoidal shape, and a rigid cylindrical frame portion comprising an assemblage of combined members that include an integrated sound tube device with at least one associated sliding whistle component. At least one air aperture is formed within the tubular wall of the sound tube and positioned so as enveloped by the interior cavity of the toy body portion. In its preferred embodiment, said toy body portion has said cylindrical frame located centrally through said toy body portion and protruding through each side thereof.

Sound can be generated by singular or collective methods: one such method of sound generation occurs when the sliding whistle component moves the length of the hollow interior cavity of the sound tube by the force of gravity, so that the sliding whistle component emits sound when the toy is rotated along various axes.

Yet another method of sound generation occurs when the sliding whistle component moves the length of the hollow interior cavity of the sound tube by centrifugal force as the orientation of the sound tube changes by reason of rapid movement.

Yet another method of sound generation occurs when the elastomeric toy body portion is physically compressed (squeezed). Upon compression, the resultant force of air that is exhibited onto the outer surface area of the sound tube will actuate air into and through the air aperture, into the hollow interior cavity of the sound tube, through the reed of the sliding whistle component, through the end of the sound tube that is exposed to free air, thereby exiting the toy and emitting sound.

Yet another method of sound generation occurs when the elastomeric toy body portion is expansively decompressed (released). Upon expansive decompression, the resultant suction of air that is exhibited onto the outer surface area of the sound tube will draw air from the open end of the sound tube that is exposed to free air, into the hollow interior cavity of the sound tube, through the reed of the sliding whistle component, into and through the air aperture, and into the toy body portion, thereby emitting sound.

These methods of mechanical sound formation increase the likelihood of sound occurrence, regardless of the manner in which the toy is handled. For example, the physical compression or expansive decompression of the toy body portion and the movement of the sliding whistle component, which is moved by gravity or by centrifugal force, ensures that sound will be produced upon virtually any active handling of the toy.

The toy does not require a battery power source.

BRIEF DESCRIPTION OF DRAWINGS

Other objects, features, and advantages will occur to those skilled in the art from the following description of the preferred embodiment, and the accompanying drawings, in which.

Although specific features of this invention are shown in some drawings and not others, this is for convenience only as each feature may be combined with any or all of the other features in accordance with the invention.

DETAILED DESCRIPTION

Figure 1:
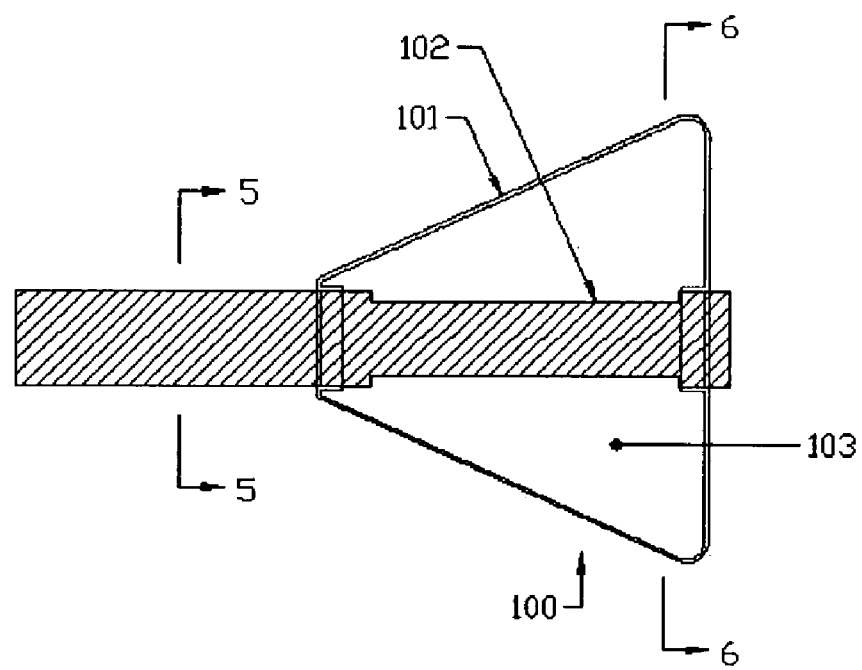
FIG. 1 is a partial sectional side view of a variable sound-emitting toy for a pet, formed in accordance with a first embodiment of this invention.

Referring now to the drawings, FIG. 1 is a partial sectional side view of a variable sound-emitting toy 100 according to aspects of the present invention, which is suitable for use in producing desired sound effects when manipulated by a user, such as a pet. As shown in FIG. 1, the toy body portion 101 preferably is (although not necessarily) comprised of a hollow three-dimensional form having a generally trapezoidal shape and having an interior space 103. Toy body portion 101 is preferably made from an elastomeric material and advantageously molded to approximately 3 mm in thickness and to a hardness in the range of 90 or less, preferably 30 to 50, most preferably 40 Shore A hardness (Scale Shore A).

As can be appreciated from FIG. 1, toy 100 includes a cylindrical frame 102 that is constructed and assembled of a rigid or semi rigid elastomeric or polymeric material, such as nylon, to support the hollow and elastomeric toy body portion 101. In the preferred embodiment of this invention, toy body portion 101 has cylindrical frame 102 located centrally through toy body portion 101 and protruding through each side thereof. Thus, the rigidity of cylindrical frame 102 provides overall structure, support, and durability for the elastomeric toy body portion 101. Additional aspects of cylindrical frame 102 are discussed in greater detail below.

Figure 2:
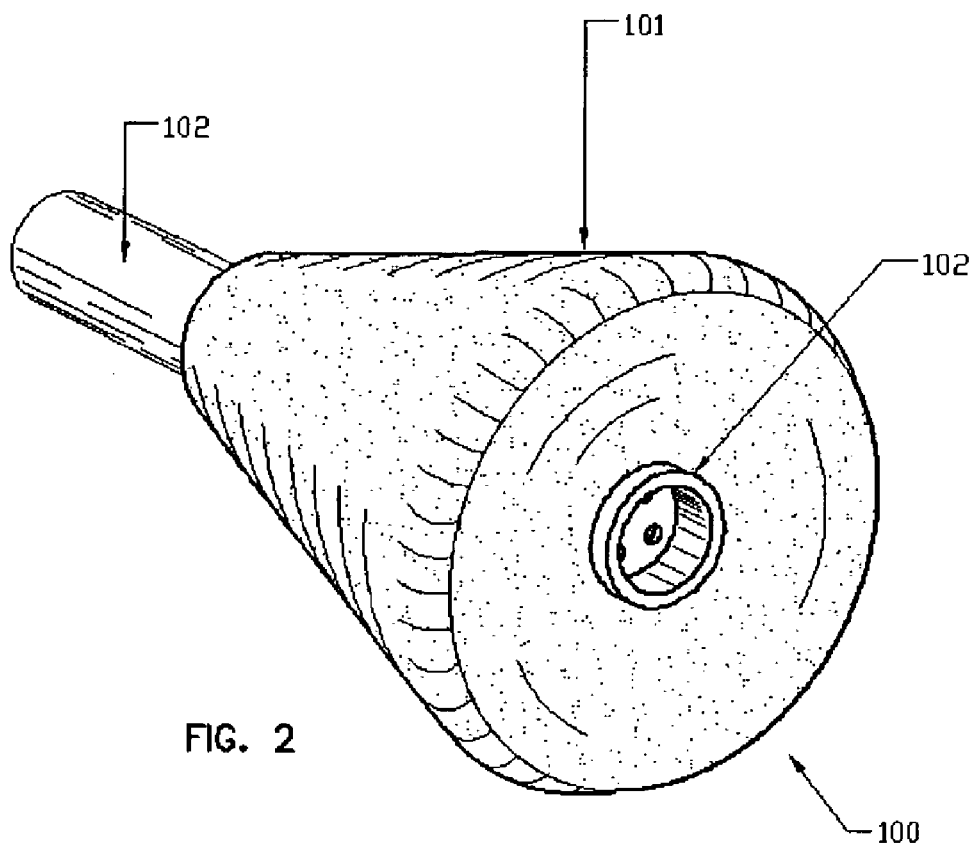
FIG. 2 is a perspective view of this same variable sound-emitting toy.

FIG. 2 is a perspective view of this same variable sound-emitting toy.

Figure 3:
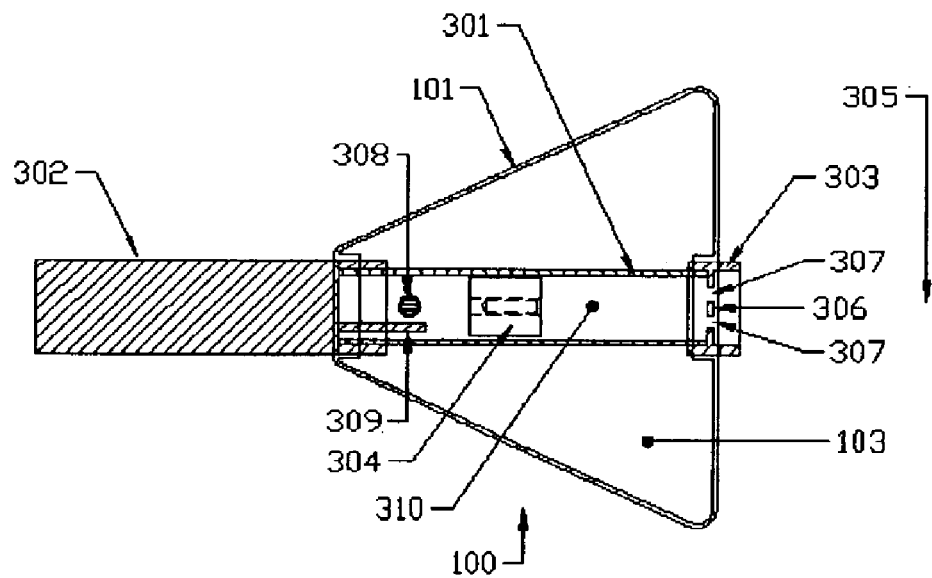
FIG. 3 is a partial sectional side view illustrating detailed aspects of the cylindrical frame as part of the variable sound-emitting toy of FIG. 1.

FIG. 3 is a partial sectional side view illustrating detailed aspects of cylindrical frame 102 of FIG. 1, which is comprised of an assemblage of sound tube 301, formed of a rigid polymeric material, such as plastic, using a readily available fabrication process, and similarly operating end-cap members 302 and 303, preferably (although not necessarily) formed of a rigid or semi rigid elastomeric or polymeric material, such as nylon, and that are advantageously molded to have hardness in the range of 90 or less, preferably 74 to 82, most preferably 78 Shore D hardness (Scale Shore D).

Sound tube 301 is a hollow tube with associated sliding whistle component 307, which will produce sound with a reed through which air passes as the whistle slides inside the length of the tube. Sound producing devices of this type are depicted in U.S. Pat. No. 5,590,875.

End-cap member 302 is closed to free air. End-cap member 303 is open to free air space 305 and further comprises a formed barrier 306 that contains air holes 307 which are open to free air space 305 and allow the passage of air into and out of sound tube 301 and also allow sound produced by sliding whistle component 304 to escape from sound tube 301. Air aperture 308 is positioned within the tubular wall of sound tube 301 and is enveloped by interior space 103 of toy body portion 101. Air aperture 308 is preferably a round hole and approximately 3 mm in diameter. Shank member 309 protrudes from and is positioned to the inner-facing surface area of end cap member 302 and formed of homogeneously molded material, such that the external tip of shank member 309 will restrict the furthermost positioning of sliding whistle component 304 proximate to end-cap member 302, thereby preventing obstruction of air ingress/egress through air aperture 308.

Figure 7:
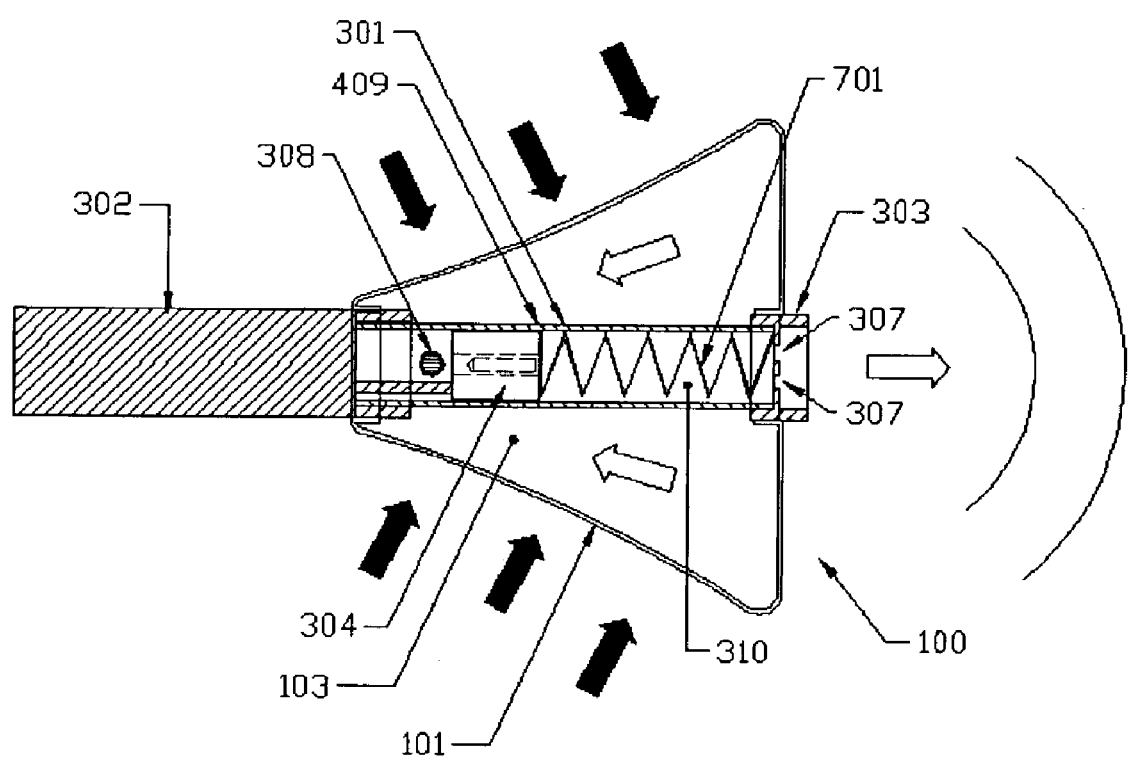
FIG. 7 is a partial side view of a variable sound-emitting toy, formed in accordance with a second alternative embodiment of this invention to include one narrow gauge coiled spring or helix device positioned within the sound tube, suitable for use as a variable sound-emitting toy.

In it's preferred embodiment, the cylindrical frame 102 of FIG. 7 carries one integrated sound tube 301 with associated sliding whistle component 304, which moves the length of the interior space 310 of sound tube 301 by the force of gravity or by centrifugal motion, so that the sliding whistle component 304 emits sound when toy 100 is moved along various axis. Air aperture 308 is positioned within the tubular wall of sound tube 301 and is enveloped by the air tight hollow cavity 103 of toy body portion 101, whereby upon physical compression or expansive decompression of surrounding toy body portion 101, air is directionally actuated into and through air aperture 308, through the internal cavity 310 of sound tube 301, through the reed of the sliding whistle component 304, through end-cap member 303 that is exposed to free air space 305, thereby exiting the toy 100 of FIG. 1 and emitting sound.

Figure 4A:
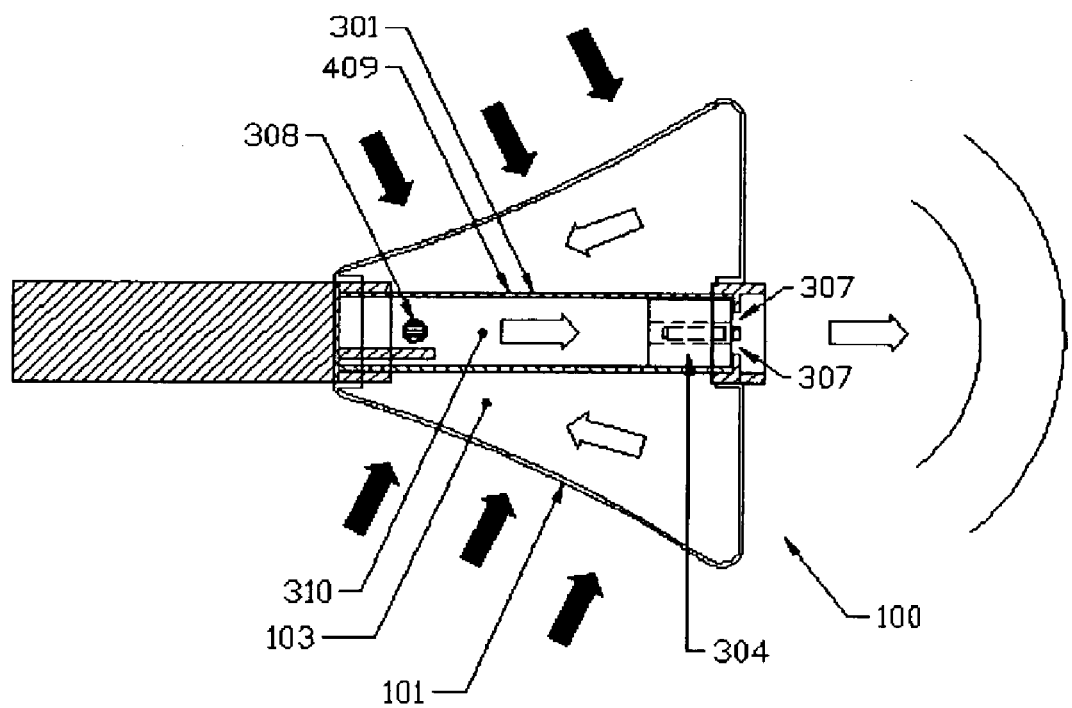
FIG. 4A is a side view of the variable sound-emitting toy of FIG. 1 and the method of air actuation by compression of the toy body portion.
Figure 4B:
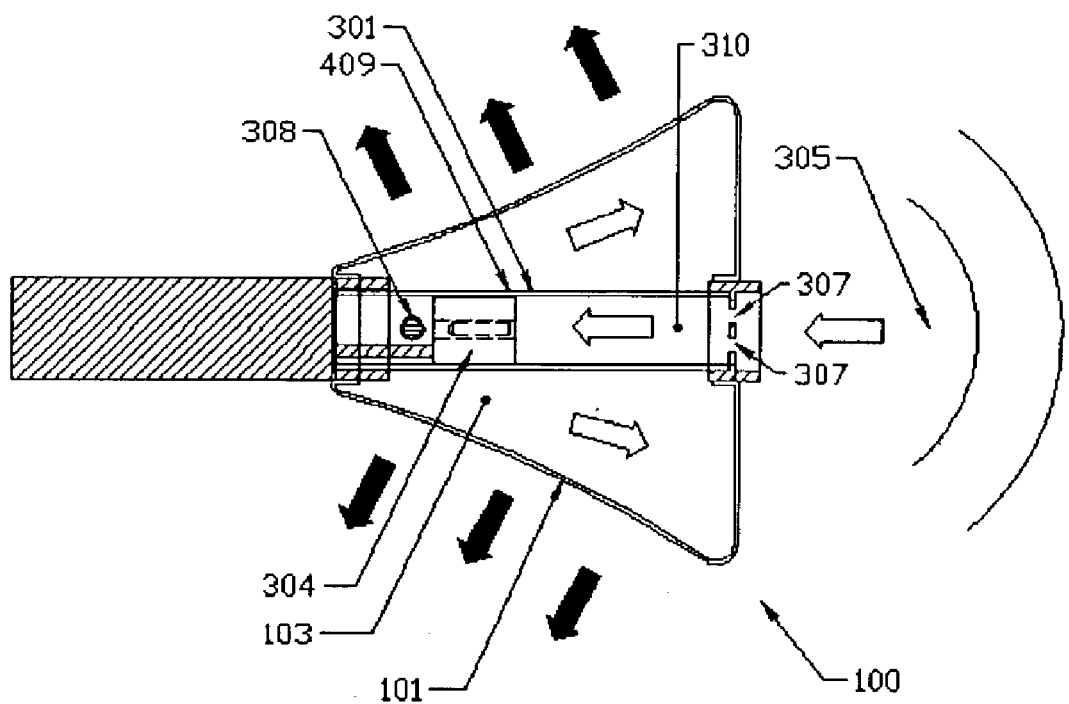
FIG. 4B is a side view of the variable sound-emitting toy of FIG. 1 and the method of air actuation by expansive decompression of the toy body portion.
Figure 4C:
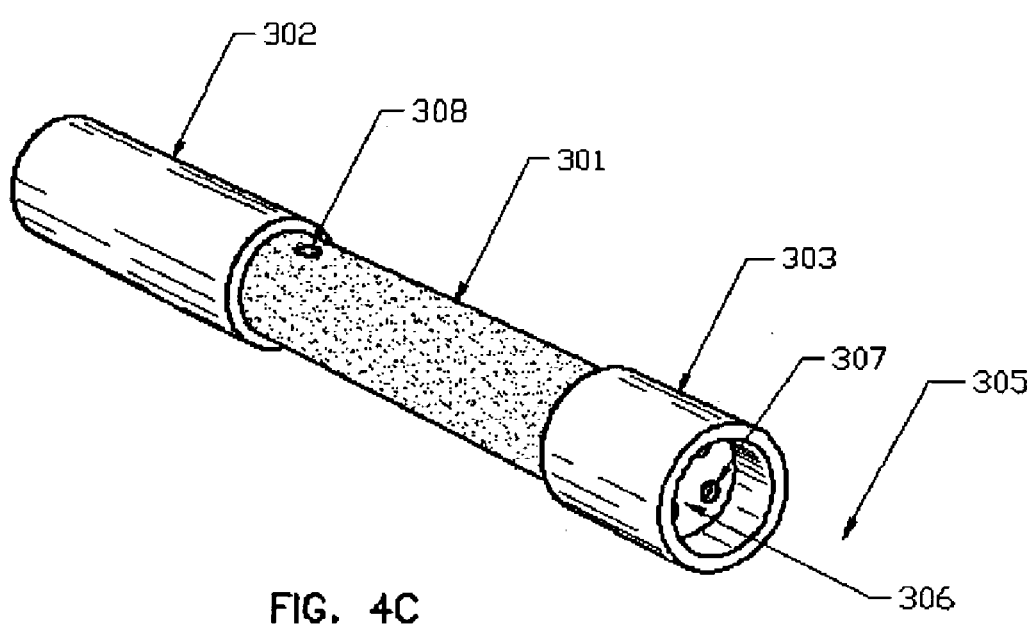
FIG. 4C is a perspective view of the cylindrical frame as part of the variable sound-emitting toy of FIG. 1.
Figure 4:
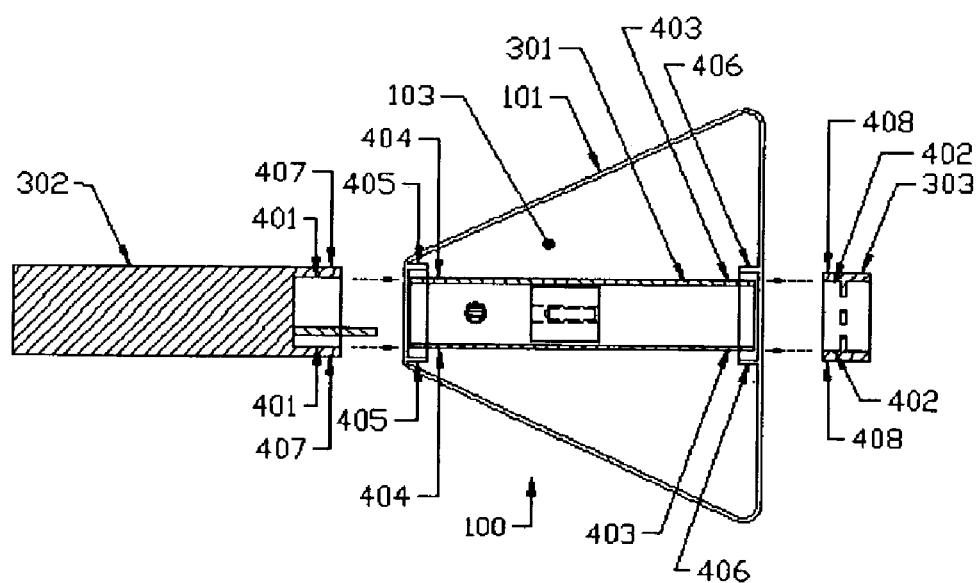
FIG. 4 is a partial sectional side view illustrating the manner in which end-cap members and sound tube portion are collectively joined to form the cylindrical frame and further illustrates the manner in which toy body portion and cylindrical frame are collectively united to form the variable sound-emitting toy of FIG. 1.

FIG. 4 is a partial sectional side view illustrating the manner in which end-cap members 302 and 303 and sound tube 301 are collectively joined to form cylindrical frame 102 of FIG. 1, and further illustrating the manner in which toy body portion 101 and cylindrical frame 102 of FIG. 1 are collectively united to form variable sound-emitting toy 100 of FIG. 1.

Within the inward face of end-cap members 302 and 303, therein exist integrally formed slip fittings 401 and 402. The outer end surface areas 403 and 404 of sound tube 301 are inserted into the slip fittings 401 and 402 of end-cap members 302 and 303, and are affixed by slip fit connection and adhesive, or by means that are known in the art. These features together comprise the preferred means in which end-cap members 302 and 303 and sound tube portion 301 are collectively joined to form cylindrical frame 102 of FIG. 1.

Inward protruding tubular sleeves 405 and 406 are integrally and centrally formed of homogeneously molded material within toy body portion 101, to partially and circumferentially overlay in parallel the surface of end-cap members 302 and 303 in areas 407 and 408. Sleeves 405 and 406 are formed of a size and shape to very tightly fit cylindrical frame end-cap members 302 and 303. To maintain toy body portion 101 onto end-cap members 302 and 303, an adhesive can be applied to sleeves 405 and 406 in areas 407 and 408, to bond toy body portion 101 onto assembled cylindrical frame 102 of FIG. 1. This also maintains positive air pressure within interior space 103 of toy body portion 101, as desired. These features together comprise the preferred means to firmly affix and hermetically seal toy body portion 101 onto cylindrical frame 102 of FIG. 1.

It should now be appreciated that the combination of toy body portion 101 and components 302, 303, 304, 306, 307, 308, 309, 310, 401, 402, 403, 404, 407 and 408, comprising cylindrical frame 102 of FIG. 7, cooperate in a manner that when surrounding toy body portion 101 is physically compressed (as shown in FIG. 4A) by a user, the resultant force of air held by interior space 103 of toy body portion 101 will be exhibited onto outer surface area 409 of sound tube 301, thereby actuating air into and through air aperture 308, through interior space 310 of sound tube 301, through the reed of the sliding whistle component 304, through air holes 307, thereby exiting toy 100 of FIG. 1 and emitting sound. Upon expansive decompression of toy body portion 101 (as shown in FIG. 4B) the resultant suction of air that is exhibited onto outer surface area 409 of sound tube 301 will draw air from free air space 305, through air holes 307, into and through the interior space 310 of sound tube 301, into and through the reed of the sliding whistle component 304, through air aperture 308 and into the interior space 103 of toy body portion 101, thereby emitting sound.

FIG. 4C is a perspective view of end-cap member 302, 303 and sound tube 301, comprising cylindrical frame 102 of FIG. 1 when assembled as depicted in FIG. 4. The view depicted in FIG. 4C is looking down upon end-cap member 303 from free air space 305. End-cap member 302 is closed to free air. End-cap member 303 includes a formed barrier 306 that contains air holes 307, which are open to free air space 305. The diameter of air aperture 308 will be sized by design to control air ingress/egress through air aperture 308 to a desirable flow rate. It should be noted that FIG. 4C is shown with toy body portion 101 of FIG. 1 removed.

Figure 5:
FIG. 5 is a view in section of the cylindrical frame taken through line 5—5 of FIG. 1.

As seen in FIG. 5, the view in section of the cylindrical frame taken through line 5—5 of FIG. 1 illustrates that the shaft of cylindrical frame 102 may have a circular cross section. Other cross sections such as oval, rectangle or an alternative indistinct shape may be used.

Figure 6:
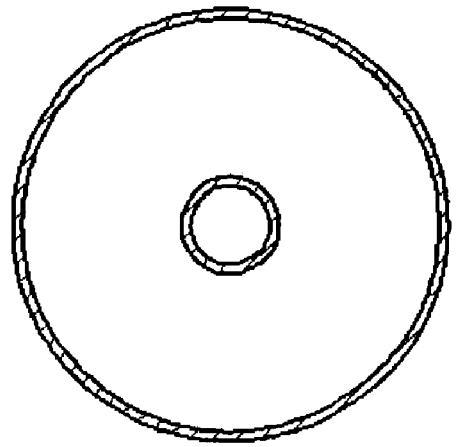
FIG. 6 is a view in section of the toy body portion taken through line 6—6 of FIG. 1.

As seen in FIG. 6, the view in section of the toy body portion taken through line 6—6 of FIG. 1 illustrates that toy body portion 101 may have a circular cross section. Other cross sections such as oval, rectangle or an alternative indistinct shape may be used.

The preferred shape of the toy of this invention is best shown in FIG. 2, and is generally trapezoidal with elongated cylindrical frame portion 102 located centrally through said toy body portion 101, and protruding through each side thereof.

FIG. 7 illustrates a second alternative embodiment, whereby sound tube 301 carried by end-cap members 302 and 303 will contain in its interior space 310 one narrow gauge coiled spring or helix device 701 that will be sized to accurately fit the inside diameter of sound tube 301 and will span the distance between slide whistle component 304, to be located adjacent to end-cap member 302, and end-cap member 303. Upon physical compression of toy body portion 101, the resultant compression of air exhibited onto the outer surface area 409 of the sound tube will actuate air into and through air aperture 308 located ahead of sliding whistle component 304, into the hollow cavity 310 of sound tube 301, through the reed of slide whistle component 304 and through air holes 307 thereby exiting the toy and emitting sound. Subsequently, the air resistance produced by the reed of the sliding whistle component 304 will pressurize the area between slide whistle component 304 and end-cap member 302, thereby actuating sliding whistle component 304 forward within sound tube 301 toward end-cap member 303, thus compressing coil spring 701. Coil spring 701 will return sliding whistle component 304 to its stationary position upon release and/or expansive decompression of toy body portion 101. Dependant upon the rate of physical force applied to elastomeric toy body portion 101 and the sequential degree of generated internal compression, the resistance supplied by coiled spring 701 will regulate the distance sliding whistle component 304 will travel forward within sound tube 301. This will cause the length of the air column to change, and subsequently will change the wavelength of the sound waves produced. The change in wavelength will result in a change in frequency resulting in variable sound formation.

Figure 8:
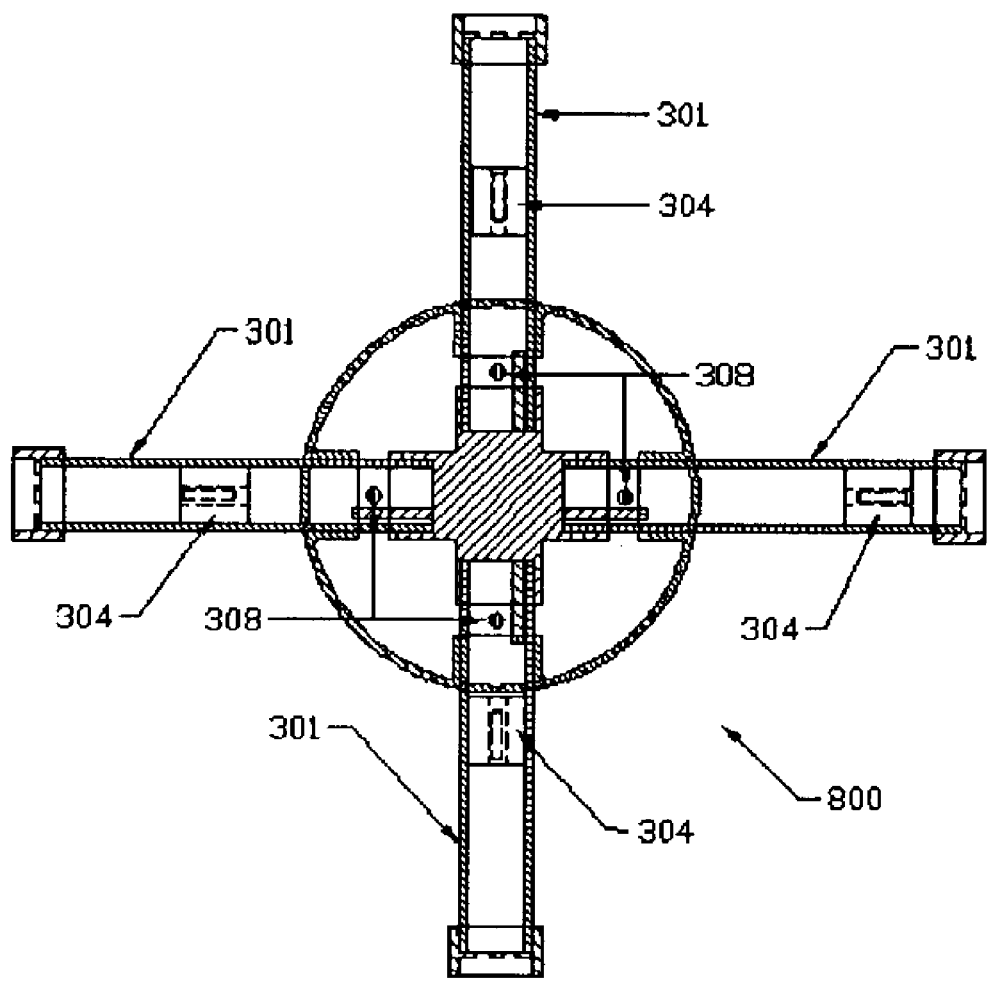
FIG. 8 is a partial side view of a combination squeeze toy and chew toy, formed in accordance with a third alternative embodiment of this invention.

FIG. 8 illustrates a third alternative embodiment of a variable sound-emitting toy formed in accordance with the preferred embodiment of this invention, wherein exist one or more cylindrical frames and may contain one or more associated sound tubes 301. Air apertures 308 are formed within the tubular wall of each said sound tube and positioned so as enveloped by the hollow cavity of toy body portion 101, whereby compression or expansive decompression of surrounding toy body portion 101 will actuate air directionally into and through each said air aperture, through the cavity of the sound tube, through the reed of each sliding whistle component 304, through the open end of each sound tube that is exposed to free air, thereby exiting the toy and emitting sound. Therefore the toy 800 emits multiple sounds and may produce multiple sound octaves as each said sliding whistle component is moved and/or when the toy body portion is physically compressed or expansively decompressed.

Figure 9:
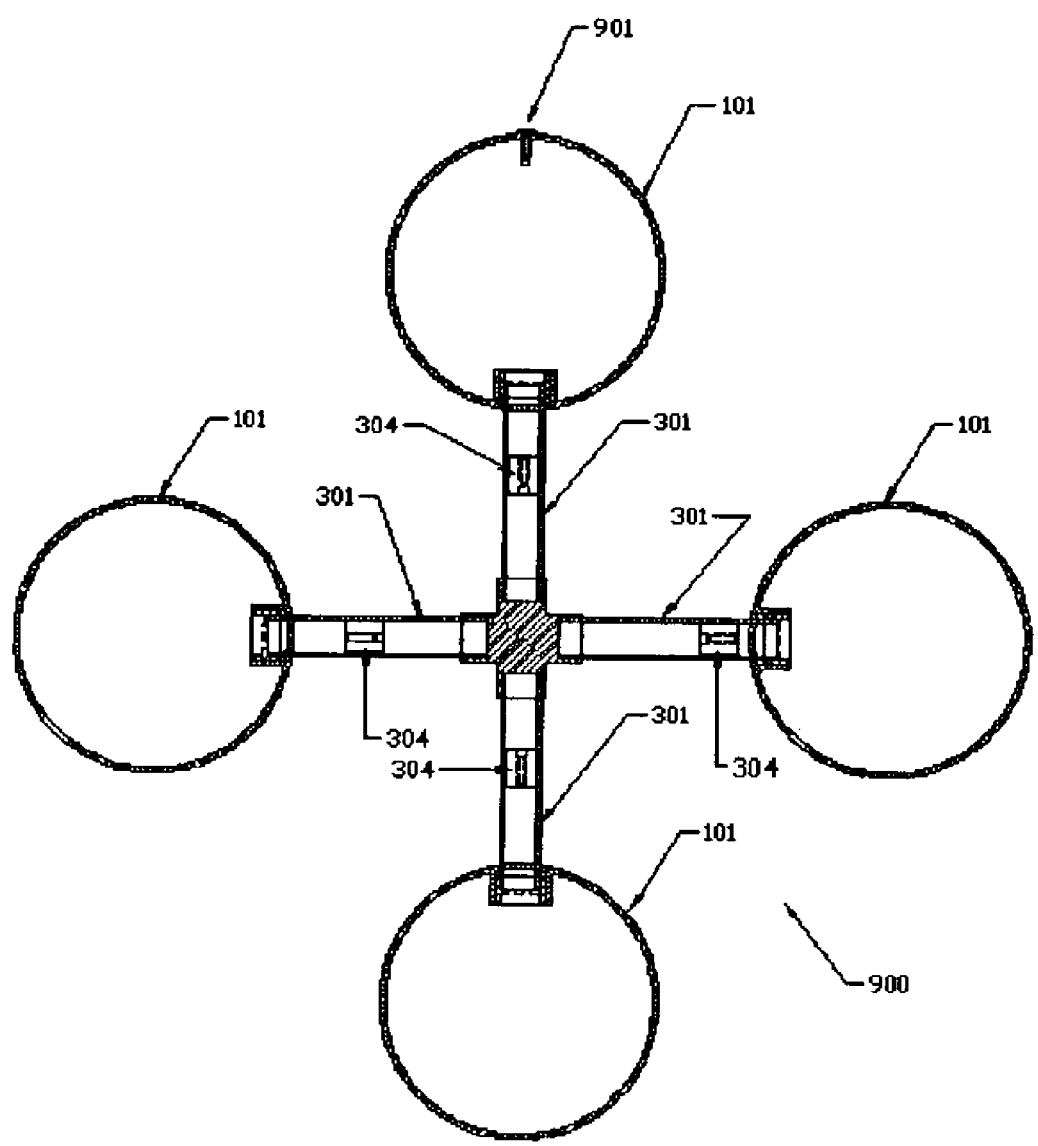
FIG. 9 is a partial side view of a combination squeeze toy and chew toy, formed in accordance with a fourth alternative embodiment of this invention, to include a conventional "squeaker" provided within the surrounding toy body portion, suitable for use as a variable sound-emitting toy.

FIG. 9 illustrates a fourth alternative embodiment of variable sound-emitting toy 900, wherein exist one or more cylindrical frames with one or more associated sound tubes 301, carrying one or more toy body portions 101, whereby the toy will emit multiple sounds, and may produce multiple sound octaves as each sliding whistle component 304 is moved. In this embodiment, the sound tubes 301 are devoid of an air aperture within the tubular wall of each sound tube. The hollow cavity of each toy body portion 101 has one or more conventional air/reed driven squeakers 901 located within the elastomeric wall of each toy body portion 101, thereby emitting sound when the elastomeric toy body portion(s) 101 is (are) physically compressed or expansively decompressed. Thus, physical compression or expansive decompression of toy body portion(s) 101 and the movement of the sliding whistle(s) 304 which is (are) moved by gravity or by centrifugal force as the orientation of toy 900 changes by reason of movement, ensures that sound will be produced upon virtually any active handling of the toy.

In the fifth alternative embodiment of a variable sound-emitting toy formed in accordance with the preferred embodiment of this invention, therein exist one or more cylindrical frames carried by one or more toy body portions.

It will thus be seen that the objects set forth above, among those made apparent from the preceding descriptions, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention, which, as a matter of language, might be said to fall therebetween.

Particularly it is to be understood that in said claims, ingredients or compounds recited in the singular are intended to include compatible mixtures of such ingredients wherever the sense permits.

Although specific features of this invention are shown in some drawings and not others, this is for convenience only as each feature may be combined with any or all of the other features in accordance with the invention.

Other embodiments will occur to those skilled in the art and are within the following claims.

What is claimed is:

1. A toy, which emits variable sounds generated by singular and/or collective methods, comprising:
    a toy body portion having a hollow three-dimensional form, having an inner surface, an interior space and an exterior surface; and
    a mechanically-operated sound tube device, wherein at least one end of said sound tube device is carried within said toy body portion, and at least one end of said sound tube device is exposed to free air, and said sound tube device including at least one sliding whistle component which moves by the force of gravity, and said sound tube device including at least one air aperture formed through an outer material layer of said sound tube device, positioned whereas said air aperture is enveloped by the interior space of said toy body portion, whereby physical compression or expansive decompression of the toy body portion will actuate air into and through said air aperture, so that said sliding whistle component of said sound tube device will emit sound when said toy body portion is manipulated by a user.

2. A toy which emits sounds as it is moved and/or when a toy body portion of the toy is physically compressed or expansively decompressed, comprising:
    a rigid cylindrical frame consisting of a mechanically-operated sound tube device and a plurality of opposing end-cap members, each said end-cap member formed of a first material having a first rigidity and a first hardness, said sound tube device including at least one sliding whistle component which moves by the force of gravity, so that said sliding whistle component of said sound tube device will emit sound when said toy is moved along various axes;
    a toy body portion formed of a second material having a second rigidity, substantially less rigid than that of the first rigidity and a second hardness substantially less hard than that of the first hardness, said toy body portion comprising a hollow three-dimensional form, having an inner surface, an interior space and an exterior surface;
    an assemblage means, wherein said cylindrical frame is positioned centrally through said toy body portion and protruding through each side thereof, whereby at least one said end-cap member of said cylindrical frame is partially exposed to free air;
    at least one air aperture formed through an outer material layer of said sound tube device, positioned whereas said air aperture is enveloped by the interior space of said toy body portion, whereby physical compression or expansive decompression of the toy body portion will actuate air into and through said air aperture, so that said sliding whistle component of said sound tube device will emit sound when said toy body portion is manipulated by a user.

3. The toy of claim 2, wherein said toy body portion is homogeneously molded of said second material.

4. The toy of claim 3, wherein said second material is substantially comprised of a soft, resiliently deformable elastomer.

5. The toy of claim 2, wherein said end-cap members are homogeneously molded of said first material.

6. The toy of claim 5, wherein said first material is substantially comprised of a rigid or semi rigid elastomer or polymer.

7. The toy of claim 2, wherein said end-cap members have a substantially formed slip fitting, whereby said cylindrical frame is formed by mating one end-cap member to each respective end of said sound tube device.

8. The toy of claim 7, wherein at least one end cap member of said cylindrical frame includes a closed external face, thereby disallowing passage of air into and out of said sound tube device.

9. The toy of claim 7, wherein at least one end-cap member includes air holes within its external face equidistant to center of said external face, which are open to free air and will allow the passage of air through the end-cap member face and into and out of said sound tube device.

10. The toy of claim 2 wherein said air aperture is positioned adjacent to at least one end-cap member having a closed external face, oppositional to at least one end-cap member that is open to free air.

11. The toy of claim 10 wherein said air aperture is preferably a round hole.

12. The toy of claim 2 wherein said first hardness of said end-cap members are molded to have a Shore D hardness of 90 or less, and said second hardness of said toy body portion is molded to have a Shore A hardness of 90 or less.

13. The toy of claim 2 further including means for tightly holding said end-cap members of said cylindrical frame proximate to the surface of said toy body portion.

14. The toy of claim 13 wherein said means for tightly holding said end-cap members of said cylindrical frame proximate to the surface of said toy body portion includes a pair of inward protruding tubular sleeves integrally and centrally formed within opposing halves of said toy body portion, positioned to partially and circumferentially overlay in parallel the surface of said end-cap members of said cylindrical frame; and
    said toy body portion and said tubular sleeves consist of homogeneously molded material.

15. A toy, which emits variable sounds generated by singular and/or collective methods, comprising:
- a toy body portion having a hollow three-dimensional form, having an inner surface, an interior space and an exterior surface; and
- a mechanically-operated sound producing device carried within said toy body portion, said sound producing device including at least one member which moves by the force of gravity, and said sound producing device including at least one air aperture formed through an outer material layer of said sound producing device, positioned whereas said air aperture is enveloped by the interior space of said toy body portion, whereby physical compression or expansive decompression of the toy body portion will actuate air into and through said air aperture, so that said member of said sound producing device will emit sound when said toy body portion is manipulated by a user;
- wherein said toy body portion will mount onto said mechanically-operated sound producing device in such a manner whereby said toy body portion and said mechanically-operated sound producing device are thus collectively united.

16. The toy of claim 15, wherein said sound producing device is a sound tube with a sliding whistle component.

* * * * *